Patented Dec. 8, 1931

1,835,571

UNITED STATES PATENT OFFICE

SYLVAN R. MERLEY, OF DOVER, NEW JERSEY, ASSIGNOR TO DOHERTY RESEARCH COMPANY, OF NEW YORK, N. Y., A CORPORATION OF DELAWARE

SEPARATION OF SECONDARY ALCOHOLS

No Drawing.  Application filed December 23, 1925. Serial No. 77,381.

The present invention relates to secondary alcohols.

A process is now being practiced whereby a mixture of secondary alcohols is produced from the olefins contained in gases from petroleum stills or like sources by absorbing the olefins in sulfuric acid and afterwards converting the sulphates so produced into alcohols. An analysis of the gases available from petroleum stills indicates the presence of a material percentage of olefins having more than 5 carbon atoms. However, the process in question has not yet been operated so as to produce a material quantity of alcohols heavier than amyl alcohol and having suitable commercial characteristics as to odor and dryness. It will be understood that the alcohols produced by the method just mentioned are obtained originally as a hydrous mixture, the original mixture of alcohols being obtained in general from a dilute mixture of the alkyl sulphates, usually by distilling a mixture of alkyl sulphates after diluting with water. The resultant mixture of light and heavy secondary alcohols, containing a considerable percentage of water, is thereupon distilled to drive off the alcohols from the acid, and cuts are made giving a rough fractionation. The cut between 88° and 100° C. contains practically all the amyl and higher alcohols and water, other cuts containing mostly butyl and isopropyl alcohols respectively. Repeated attempts to obtain amyl alcohol and alcohols heavier than amyl by simple fractional distillation of the cut containing such alcohols have failed to yield alcohol heavier than amyl in commercial quality even though the butyl and lighter alcohols obtained from the other cuts were of good quality and needed little or no refining to meet the ordinary commercial specifications. Amyl alcohol, to be sure has been obtained by distillation of the heavy alcohol cut in question. In distilling this cut for amyl alcohol, it has been the practice to dehydrate the mixture of amyl and heavier alcohols before further fractionation is attempted. Such dehydration may be accomplished by distilling with dry butyl or other lighter alcohol as described and claimed in my co-pending application Ser. No. 77,134, filed December 22, 1925, for dehydration of alcohols. The present invention, is not limited to dehydrating the amyl alcohol containing mixture before further fractionation, or to any particular method of dehydration if such a preliminary step is practiced.

The practice prior to the present invention has been to distill the mixture of amyl, hexyl and heavier alcohols to drive off the amyl alcohol. The amyl alcohol derived from the mixture by distillation has invariably been somewhat off odor and has contained moisture, but the commercial requirements as to amyl alcohol are not rigid and it has not been difficult to refine the amyl alcohol so obtained. However, the hexyl and heavier alcohols remaining in the still after distilling off the amyl alcohol have always been defective in containing bad smelling compounds to an extent objectionable to the trade. Repeated distillation of the mixture of hexyl and heavier alcohols has failed to give hexyl and heavier alcohol of the required dryness. The quantity yields also have been disappointing.

I have discovered that the water and bad odor in amyl alcohol and in the heavier alcohols produced from a mixture of amyl and heavier alcohols by distillation have come from the fact that the hexyl and heavier secondary alcohols and to a lesser extent the amyl alcohol, partially break down at the temperatures attained when distilling a mixture containing such alcohols under atmospheric pressures. This disruption of some of the molecules of the alcohols being distilled produces water and off-odor compounds. The breaking down of the amyl molecules is relatively slight but there is a material breaking down of molecules of heavier alcohols at a cut temperature equal to the boiling point of amyl alcohol. The breaking down of the molecules of the secondary alcohols is dependent not only on the temperature but also on the time the alcohols are subjected to a given temperature. In other words, a given amount or percentage of decomposition may be caused by subjecting the molecules to a lower temperature for a longer length of time or caused by a higher temperature for a shorter length of time. If the column is well insulated, the distillation proceeds at a higher rate for a given temperature and a higher cut temperature is desirable because of the less time the alcohols are subjected to the temperature. Insofar as the breaking down of the heavy alcohol molecules is due to the temperature, it is immaterial in what part of the apparatus the temperature occurs. The usual apparatus for distillation of alcohols includes a still body, a column above the still and a dephlegmator above the column. The highest temperatures in such an apparatus, of course, occur in the bottom of the still and presumably the decomposition of the heavy alcohols occurs mainly in the still proper. The breaking of the molecules during distillation has another bad result, in that the water produced acts to carry over some of the material below its normal boiling point, making it commercially impossible to separate the hexyl, heptyl and heavier secondary alcohols by simple distillation. When a given dry cut or mixture containing secondary hexyl alcohol and alcohols having more than six carbon atoms was distillated, it is possible to determine whether or not the alcohols are being decomposed under conditions of the distillation by noticing if a material amount of water is being formed. Whenever a visible layer of water forms at the bottom of the condensate after it has reached atmospheric temperature, the operator may know that some of the alcohols are being decomposed by the temperature in the distilling apparatus. It is therefore necessary according to the present invention, when not using steam that the vacuum or equivalent conditions be maintained such as to prevent the formation of sufficient water to be visible in the collected condensate when at atmospheric temperatures.

It is proposed according to the present invention to avoid the difficulties just mentioned and to separate amyl from other heavier alcohols as well as hexyl and heavier alcohols from mixtures containing them by distilling a mixture including amyl and heavier secondary alcohols, or a mixture of hexyl and heavier alcohols, under a vacuum so that fractional distillation may be accomplished without employing temperatures capable of breaking down the alcohols in question. During the vacuum distillation or distillation under reduced pressure the amyl alcohol contained in the mixture is first distilled off and substantially pure cuts of hexyl, heptyl, octyl, nonyl, decyl and heavier alcohols can then be obtained, care being taken that the pressure in the still is maintained low enough so that the temperature never reaches a point sufficient to break down any appreciable amount of the mixture. No mixture has been experimented with having any component breaking down to any appreciable extent at 100° C. measured at the point between the column and the dephlegmator, the cut temperature being measured between the column and the dephlegmator. It has been found practical to maintain the vacuum at a point to keep the temperature at this point down to 100° C. or less during distillation of the amyl and hexyl cuts. With commercial apparatus, some breaking down is apt to occur during the passing over of the heptyl cut even with the best vacuum obtainable. The octyl cut and cuts of alcohols heavier than octyl break down to a greater extent. The amyl, as well as hexyl, cut thus obtained is substantially anhydrous and of good odor, assuming that the mixture of amyl or hexyl and heavier alcohols contained practically no bad smelling compounds at the beginning of the vacuum distillation. Once fairly pure cuts have been obtained, however, it is possible to refine the individual alcohols to meet the commercial requirements by further vacuum distillation. This is true whether the bad odors in the cuts came from the original mixture or were formed when the cuts were made.

It has been found quite practicable to carry out the steps of the process prior to the vacuum distillation so that the mixture of amyl, hexyl and heavier secondary alcohols to be subjected to the vacuum distillation shall be practically free of bad smelling compounds. One suitable way of so conducting the prior steps of the process of manufacturing the mixture of secondary alcohols is disclosed in my co-pending application Ser. No. 97,600, filed March 26, 1926, olefines in still or like gases are absorbed in cooled concentrated sulfuric acid to form a mixture of alkyl sulfates including amyl, hexyl and heavier alkyl radicals. The mixture of sulfates so formed and usually including both normal and acid sulfates with some sulfuric acid, is then preferably diluted with four volumes of water and heated under a reflux condenser for four hours at atmospheric pressure to hydrolyze the alkyl sulfates and alkyl sulfuric acids, forming secondary alcohols corresponding to the olefines in the gases and sulfuric acid. The mixture of alcohols and acid is then distilled to separate the alcohols from acid. Usually in conducting this distillation amyl, hexyl and heavier secondary alcohols are collected as a separate cut. Moreover, the constant boiling mixtures of isopropyl and secondary butyl alcohols carry off a certain amount of bad smelling compounds during the distillation at atmospheric pressures if such bad smelling compounds were originally present. However the present invention is not limited to a mixture from a given source. I have found that bad smelling compounds may be removed from the mixture of amyl, hexyl and heavier alcohols when initially present therein in preparing the mixture for distillation for amyl alcohol or heavier alcohols. One method of removing the bad odors is by washing the mixture with benzene sulfonic acid containing a lighter alcohol such as isopropyl alocohol. The benzene sulfonic acid and isopropyl alcohol dissolve the heavy alcohols, causing the bad smelling compounds to separate out as a distinct layer from which the acid and alcohols can be decanted. The alocohols can then be separated from the sulfonic acid by distillation. This method of removing bad smelling compounds from hexyl or heavier secondary alcohols is disclosed and claimed in the co-pending application Ser. No. 97,599 filed March 26, 1926, and is not claimed herein as such. Neither is the present invention limited to removing bad smelling compounds by this method. It will be seen, however, that the present invention is applicable not only to mixtures containing amyl as well as hexyl and heavier secondary alcohols, but also to mixtures of secondary alcohols containing substantially nothing lighter than hexyl alcohol, or in other words, nothing having less than six carbon atoms in its molecules, such as the mixture remaining in the still after driving off amyl alcohol at atmospheric pressures from a mixture containing amyl, hexyl and heavier secondary alcohols. The amyl, hexyl and heavier alcohols obtained by the present invention are of high commercial grade and the yields are a high percentage of the corresponding olefines originally absorbed from the gas. Another aspect of the present process is that it affords opportunity of separating secondary amyl from a mixture of amyl and heavier secondary alcohols without producing odors contaminating the hexyl and heavier alcohols.

Having thus described my invention, I claim:

1. The method of obtaining hexyl and heavier secondary alcohols from a dilute mixture of secondary alcohols both lighter and heavier than amyl, comprising distilling said mixture to separate hexyl and heavier secondary alcohols therefrom, separating the hexyl and heavier secondary alcohols obtained from said distillation by distillation in vacuo, and maintaining the cut temperature during the vacuum distillation below the normal boiling point of amyl alcohol.

2. The method of obtaining hexyl and heavier secondary alcohols from a mixture of secondary alcohols containing alcohols lighter and heavier than amyl alcohol, which comprises separating the amyl and lighter alcohols than amyl from the mixture containing hexyl and heavier alcohols by distillation, washing the remainder of said mixture containing hexyl and heavier secondary alcohols with a mixture of benzene sulphonic acid and isopropyl alcohol to remove bad smelling compounds therefrom, thereafter distilling the mixture of hexyl and heavier secondary alcohols under reduced pressure and maintaining the cut temperature during the distillation at a point below the normal boiling point of amyl alcohol.

3. The process of separating secondary alcohols from a mixture of secondary alcohols containing amyl, hexyl and other higher secondary alcohols, which comprises subjecting the mixture to distillation under a subatmospheric pressure sufficient to prevent substantial decomposition of said alcohols, successively and separately removing said alcohols as vapors during said distillation, and maintaining the temperature of said mixture during the removal of the amyl and hexyl alcohols at a point not exceeding 100° C.

4. The process of separating secondary alcohols from a mixture of secondary alcohols containing hexyl and other higher secondary alcohols, which comprises subjecting the mixture to distillation under a subatmospheric pressure sufficient to prevent substantial decomposition of said alcohols, successively and separately removing said alcohols as vapors during said distillation, and maintaining the temperature of said mixture during the removal of the hexyl alcohol at a point not exceeding 100° C.

5. The process of separating hexyl and heavier secondary alcohols from amyl and lighter alcohols by vacuum distillation, which comprises steam distilling a mixture containing alcohols lighter and heavier than amyl alcohol at atmospheric pressure until the lighter alcohols including amyl come off, washing the remainder of the alcoholic mixture with a mixture containing benzene sulfonic acid and isopropyl alcohol, then separating the heavier alcohols from each other by distillation in vacuum maintaining a temperature sufficient to prevent decomposition of the alcohols.

In testimony whereof I affix my signature.

SYLVAN R. MERLEY.